United States Patent [19]
Toner

[11] Patent Number: 6,098,754
[45] Date of Patent: Aug. 8, 2000

[54] PNEUMATIC GREASING SYSTEM FOR A FIFTH WHEEL

[76] Inventor: Mark E. Toner, 2604 Bradwood Rd., Wilmington, Del. 19810

[21] Appl. No.: 09/238,058

[22] Filed: Jan. 27, 1999

[51] Int. Cl.[7] ............................... F16N 7/36; B62D 53/08
[52] U.S. Cl. ............................ 184/14; 184/55.1; 280/433
[58] Field of Search ............................. 184/14, 55.1, 57, 184/81, 105.1; 280/421, 433, 441.1

[56] References Cited

U.S. PATENT DOCUMENTS

| | | | |
|---|---|---|---|
| 3,622,173 | 11/1971 | Hodgson | 280/125 |
| 3,743,054 | 7/1973 | Jones, Jr. | 184/14 |
| 4,541,651 | 9/1985 | Koster | 280/433 |
| 4,805,926 | 2/1989 | Mamery | 280/433 |
| 4,913,263 | 4/1990 | Spiers | 184/105.1 |
| 5,165,714 | 11/1992 | Kaim | 280/433 |
| 5,417,308 | 5/1995 | Hartl | 280/433 |
| 5,522,613 | 6/1996 | Heeb | 280/433 |

FOREIGN PATENT DOCUMENTS

| | | |
|---|---|---|
| 130402 | 1/1985 | European Pat. Off. . |
| 2596497 | 10/1989 | France . |
| 2535151 | 2/1977 | Germany . |
| 3118633 | 11/1982 | Germany . |
| 698831 | 11/1979 | U.S.S.R. . |

*Primary Examiner*—Mary Ann Battista
*Assistant Examiner*—Chong H. Kim
*Attorney, Agent, or Firm*—Richard C. Litman

[57] ABSTRACT

The pneumatic greasing system for the fifth wheel of a semitrailer uses compressed air tanks to power a pneumatic grease pump delivering grease from a reservoir mounted behind the cab of the tractor to the fifth wheel. The pump is actuated by an electronic switch mounted on the gear shift lever controlled by the operator of the tractor-trailer rig, the switch energizing a solenoid mounted at the pump and reservoir. The grease is delivered to a grease manifold mounted at the anterior portion of the lower plate of the fifth wheel, from which it is distributed to multiple compartments constituting a grease pan installed on the bottom of the lower plate. Air pressure forces the grease from the compartments of the grease pan through a plurality of countersunk orifices in the lower plate. Longitudinal and rotational movement of the bearing surfaces of the upper and lower plates ensure a uniform distribution of grease in the fifth wheel.

8 Claims, 6 Drawing Sheets

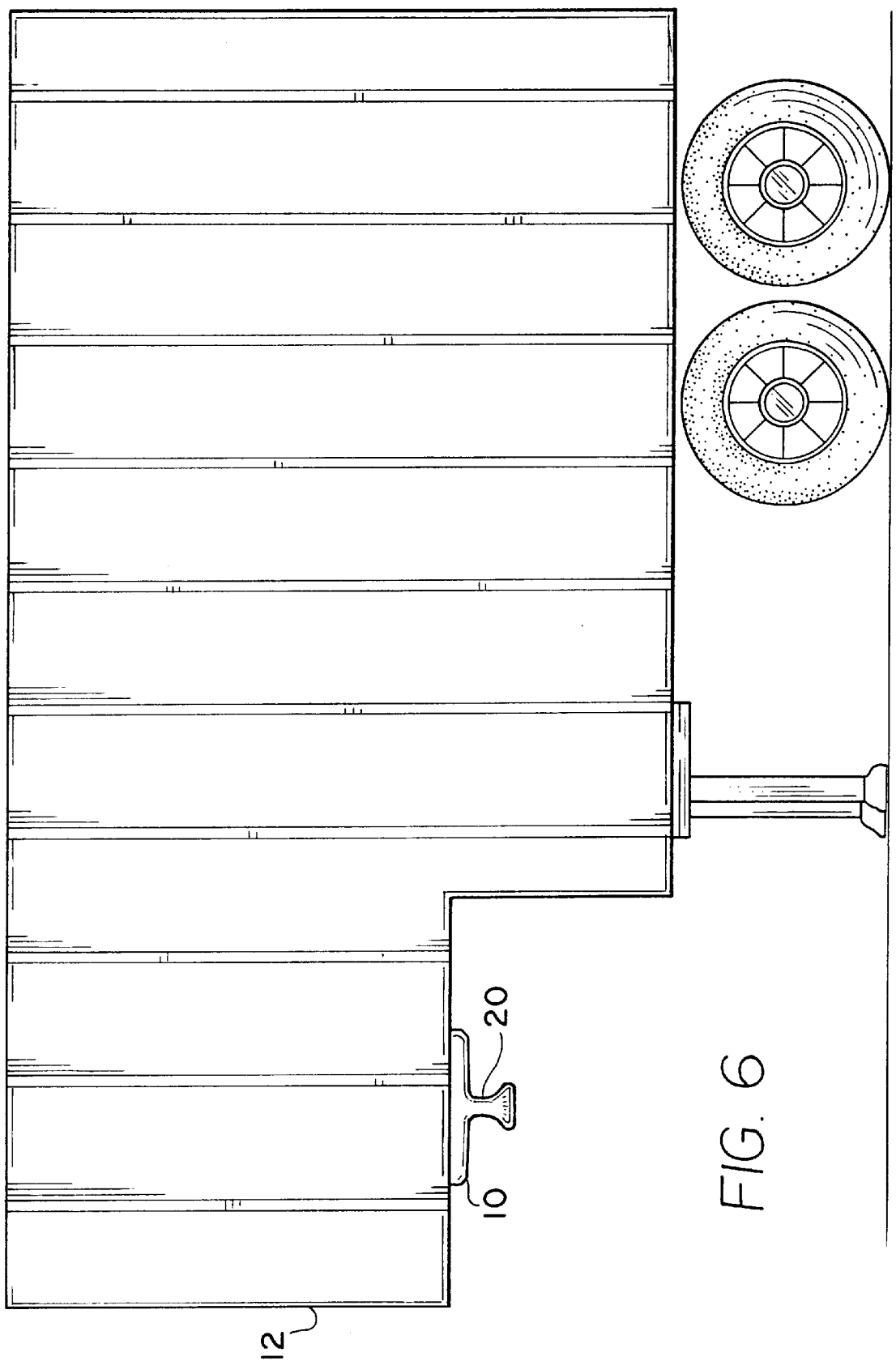

PNEUMATIC GREASING SYSTEM FOR A FIFTH WHEEL

BACKGROUND OF THE INVENTION

1. Field of the Invention

The present invention relates to lubrication devices for tractor-trailers, and particularly to a pneumatic greasing system for the fifth wheel of a semitrailer rig.

2. Description of the Related Art

A large quantity of manufactured goods and other cargo are transported by means of a tractor truck hauling a semitrailer in which part of the weight of the trailer is borne by the tractor. The semitrailer is usually coupled to the tractor by a device called a fifth wheel, comprising a generally round base plate pivotally mounted on a saddle bracket on the tractor chassis above the rear axles, and an upper plate on the bottom surface of the front part of the semitrailer. A kingpin depends from the upper plate which is locked into a slot or opening in the base plate so that the upper plate and the base plate are bearing surfaces on which the semitrailer is supported.

The upper plate rotates in contact with the surface of the base plate, the kingpin acting as the pivot, as the rig negotiates curves and turns. While the kingpin generally prevents any large longitudinal movements of the semitrailer with respect to the tractor, nevertheless, the bearing surfaces of the upper plate and the base plate are subjected to shearing forces from longitudinal movement of the semi-trailer towards and away from the tractor, particularly as the rig goes up and down hills and the loads shift.

It is therefore of great importance to maintain lubrication between the bearing surfaces of the fifth wheel. Without lubrication the bearing plates are subjected to a tremendous amount of wear through friction and may seize, preventing rotational movement of the semitrailer. At best, handling of the truck becomes very difficult, and at worst the fifth wheel may seize at a critical moment, causing the vehicle to overturn.

The most commonly used method of lubrication is manual. The semitrailer is unhooked from the tractor and the driver applies grease to the base plate of the fifth wheel with a manual grease gun, or vehicle service personal will clean the old grease from the bearing surfaces and apply a new layer of grease with a pneumatically powered grease gun. Consequently, lubrication of the fifth wheel depends on conscientious adherence to a regular program of lubrication by the owner or operator of the tractor trailer. Unfortunately, regular lubrication maintenance schedules are often not adhered to due to the pressure of time constraints in a busy delivery schedule, or due to the inconvenience and mess associated with the process.

It is therefore desirable to have a process for lubricating the fifth wheel of a tractor and semitrailer which is quick, easy to perform, and which avoids the inconveniences associated with manually greasing the wheel. A variety of devices and processes have been proposed for improving the lubrication of the fifth wheel.

U.S. Pat. No. 3,622,173, issued Nov. 23, 1971 to D.W. Hodgson, describes a pair of fifth wheel plates having mating ridges and grooves with radial spaces extending through the ridges and grooves to better retain lubrication injected from outside the plates. U.S. Pat. No. 3,743,054, issued Jul. 3, 1973 to E.C. Jones, Jr., shows a fifth wheel having an upper plate welded to the trailer and a lower plate welded to the tractor. The trailer has a false bottom. A grease tube extends from a grease gun mounted on the outside of the trailer through the side of the trailer into the false bottom, the grease tube having openings which register with holes in the upper plate.

U.S. Pat. No. 4,541,651, issued Sep. 17, 1985 to R.E. Koster, teaches a liquid lubricant flowing from a reservoir outside the trailer by gravity to another reservoir above the upper plate. The second reservoir has a ball spring valve which releases lubricant between the plates. U.S. Pat. No. 4,805,926, issued Feb. 21, 1989 to G. Mamery, describes a self-lubricating plastic plate between the upper and lower plates of the fifth wheel.

U.S. Pat. No. 4,913,263, issued Apr. 3, 1990 to D. D. Spiers, teaches grease for the fifth wheel contained in plastic envelopes which are placed between the plates of the fifth wheel. The weight of the trailer crushes the envelopes to release the grease, the plastic disintegrating with rotation of the plates. U.S. Pat. No. 5,165,714, issued Nov. 24, 1992 to J. W. Kaim, shows a wear liner between the upper and lower plates of the fifth wheel for lubrication.

U.S. Pat. No. 5,522,613, issued Jun. 4, 1996 to J. P. Heeb, shows a plurality of lubricating pads secured to the lower plate of the fifth wheel, the pads having a steel underlayer with studs extending through orifices in the plate secured by nuts on the opposite side of the plate. The pads are made of a lubricating material, either nylon with embedded glass fibers, or polytetraf luoroethylene in a sintered matrix. German Patent No. 2,535,151, published Feb. 10, 1977, shows a saddle coupling with lubricated contact surfaces having several large grooves and numerous finer grooves over the surface of the coupler body for better distribution of grease injected into the large grooves through grease nipples inserted in holes in the side of the bearing plate.

Soviet Patent No. 698,831, published Nov. 25, 1979, teaches an intermediate plate with teeth which engage pawls, one pawl on the tractor and one pawl on the trailer. The plates ratchets when the vehicle turns in one direction but not in the other. The plate has radial channels fed from a lubricant reservoir. German Patent No. 3,118,633, published Nov. 25, 1982, shows a saddle coupler having Z-shaped grooves equipped with grease nozzles for circulating lubricant. The wheel also has outlet grooves to ensure a constant flow of grease.

European Patent No. 130,402, published Jan. 9, 1985, describes a coupler plate having a number of internal passageways for circulating lubricant, the passageways being formed by placing pipes in the mold when the coupler plate is formed. French Patent No. 2,596,497, published Oct. 2, 1987, teaches a pneumatic grease pump for a fifth wheel operated by compressed air from the air brake system, the grease being pumped into a network of grooves milled into either the saddle plate on the tractor or the yoke plate on the semitrailer. The grease pump is activated by a "detector" which detects a condition indicating the vehicle is being started. The grease pump provides grease for a predetermined time interval.

None of the above patents is seen to describe a grease pump powered by an independent supply of compressed air. None of the above patents is seen to describe a grease pan for a fifth wheel having a plurality of compartments on the bottom surface of the lower plate of the fifth wheel with a plurality of orifices communicating between the grease pan and the wheel for the delivery of grease. None of the above patents is seen to describe a pneumatically controlled system operated under electrical control by the operator of the rig, for a duration determined by the operator of the rig.

None of the above inventions and patents, taken either singularly or in combination, is seen to describe the instant invention as claimed. Thus a pneumatic greasing system for a fifth wheel solving the aforementioned problems is desired.

SUMMARY OF THE INVENTION

The pneumatic greasing system for the fifth wheel of a semitrailer uses compressed air tanks to power a pneumatic grease pump delivering grease from a reservoir mounted behind the cab of the tractor to the fifth wheel. The pump is actuated by an electronic switch mounted on the gear shift lever controlled by the operator of the tractor-trailer rig, the switch energizing a solenoid mounted at the pump and reservoir. The grease is delivered to a grease manifold mounted at the anterior portion of the lower plate of the fifth wheel, from which it is distributed to multiple compartments constituting a grease pan installed on the bottom of the lower plate. Air pressure forces the grease from the compartments of the grease pan through a plurality of countersunk orifices in the lower plate. Longitudinal and rotational movement of the bearing surfaces of the upper and lower plates ensure a uniform distribution of grease in the fifth wheel.

Accordingly, it is a principal object of the invention to provide a system for lubricating the fifth wheel of a semi-trailer which eliminates the necessity of unhooking the tractor from the semitrailer in order to manually grease the fifth wheel by providing a pneumatic greasing system which may be activated by the operator of the semitrailer using an electronic switch accessible from the driver's seat of the tractor.

It is another object of the invention to provide a pneumatic greasing system for the fifth wheel of a semitrailer which provides uniform distribution of grease from a plurality of orifices in the surface of the lower plate of the fifth wheel by using air pressure to operate a pneumatic grease pump which forces grease from a grease pan through the orifices of the lower plate, eliminating the usual soiling of hands and clothing associated with manual greasing of the fifth wheel.

It is a further object of the invention to provide a means for lubricating the fifth wheel by means of a pneumatic grease pump which does not require tapping into the vehicle's air brake system.

Still another object of the invention is to provide a fifth wheel lubricating system which provides a method for maintaining lubrication of the fifth wheel of a semitrailer which reduces the amount of time the tractor and trailer are out of service.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6 is a lateral view of a semitrailer showing the upper plate of the fifth wheel and the kingpin according to the present invention.

Similar reference characters denote corresponding features consistently throughout the attached drawings.

DETAILED DESCRIPTION OF THE PREFERRED EMBODIMENTS

Figure 1:
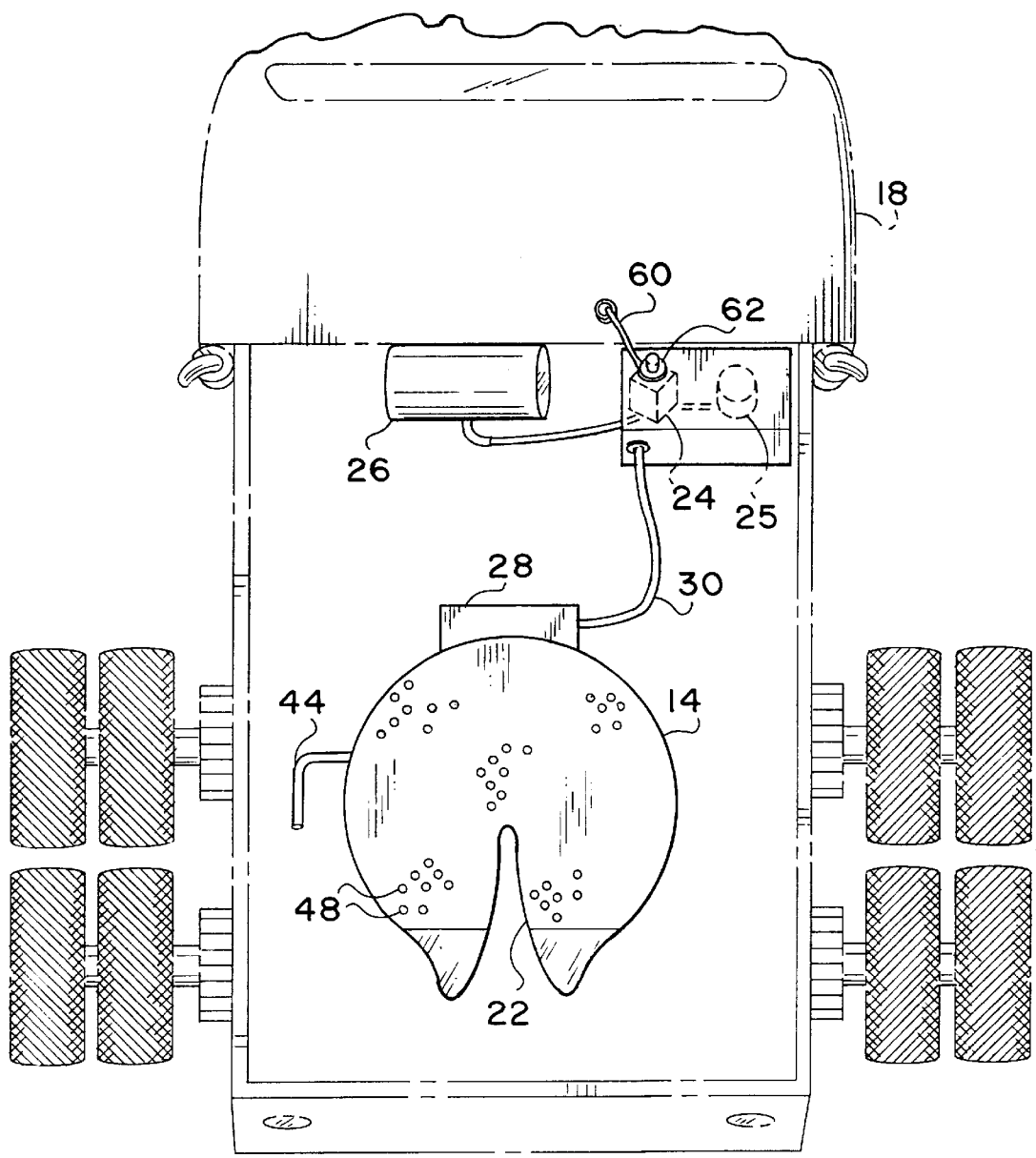
FIG. 1 is a top, perspective view of a pneumatic greasing system for a fifth wheel mounted on the bed of a tractor according to the present invention.

The present invention is a pneumatic greasing system for the fifth wheel of a tractor-trailer rig, and particularly for a semitrailer rather than a full trailer. The conventional fifth wheel generally includes an upper plate 10 bolted, welded, or otherwise fixedly attached to the bottom of the front portion of a semitrailer 12, as shown in FIG. 6, and a lower plate 14 attached to the bed of a tractor 18, as shown in FIG. 1. A kingpin 20 depending from the surface of the upper plate 10 engages a slot 22 defined in the lower plate 14 and is locked in place by a pair of jaws and/or a crosspin (not shown). The engagement of the kingpin 20 with the slot 22 generally prevents vertical or longitudinal movement of the semitrailer 12 with respect to the tractor 18. There is, however, rotational movement of the upper plate 12 with respect to the lower plate 14, and tension, compression and shear forces during movement of the tractor-trailer which cause longitudinal rubbing of the surfaces of the plates 10 and 14.

The pneumatic greasing system includes a pneumatic grease pump 24 with a five gallon grease reservoir 25 mounted on the bed of the tractor 18 behind the cab. Tractors come in various sizes and designs, some having a housing behind the cab in which the pneumatic grease pump 24 and reservoir 25 may be housed. If the pump 24 is housed external to the cab, it is preferably contained within a plastic or metal box for protection from the elements. The grease pump 24 is supplied with a source of compressed air, such as a tank 26 or compressor. In the drawings, only one tank is shown, although it will be understood that more than one tank 26 may be used. The air tank 26 is mounted on the tractor 18, preferably behind the cab.

Figure 2:
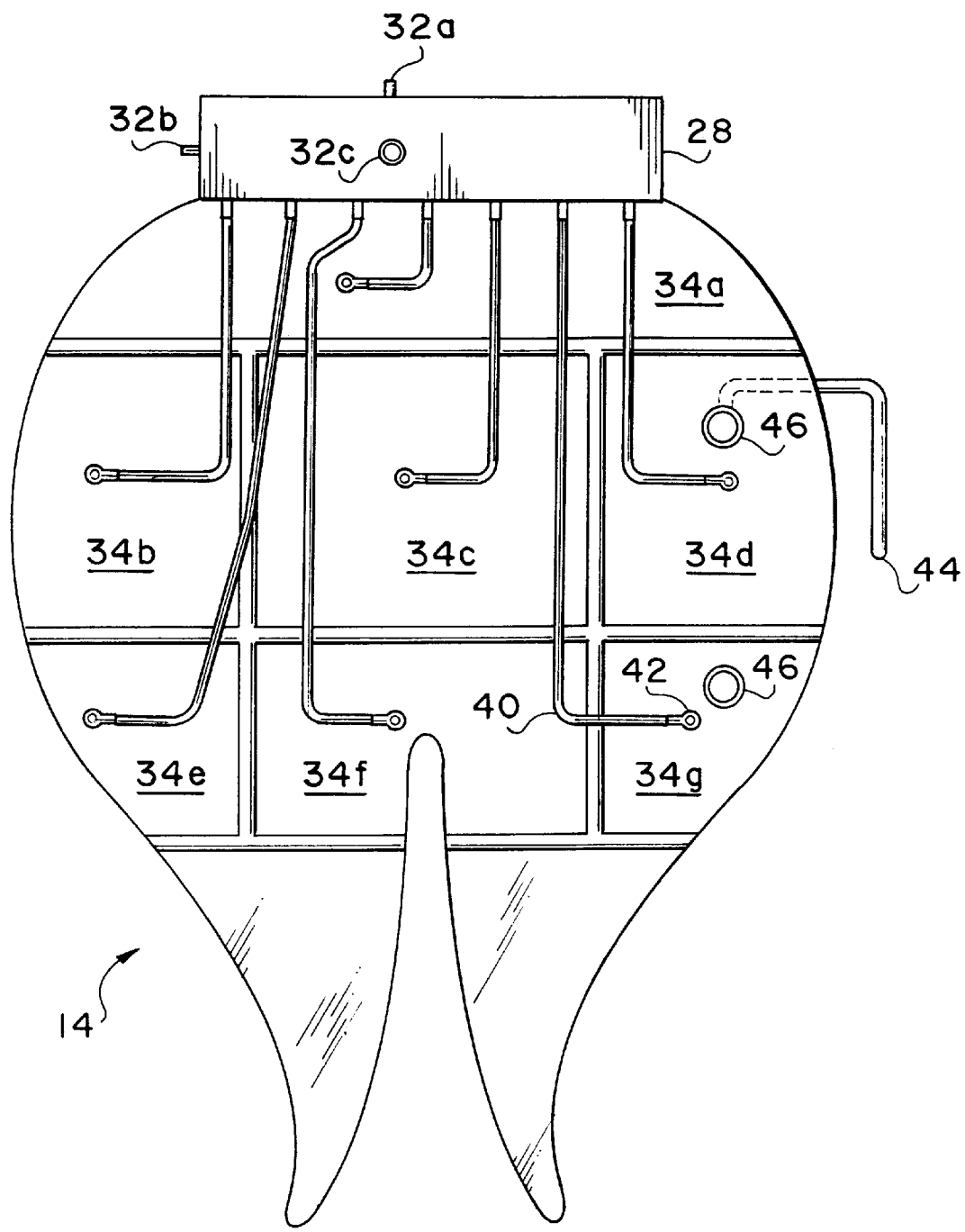
FIG. 2 is a bottom view of the lower plate of a fifth wheel equipped with a grease pan according to the present invention.

Grease is fed from the pump 24 to a grease manifold 28 mounted at the front of the lower plate 14 of the fifth wheel by a grease line 30. As shown more particularly in FIG. 2, the grease manifold 28 has a plurality of grease fittings 32a–32c adapted for connection to the grease line 30 by quick connect grease fittings. The version of the grease manifold 28 shown in the drawings includes fittings on the front 32a, side 32b, and bottom 32c of the manifold 28 in order to accommodate the different designs and styles of tractors 18 and fifth wheel plates 14. In practice the grease hose 30 is connected to only one of the fittings 32a–32c and the other two are plugged.

Figure 3:
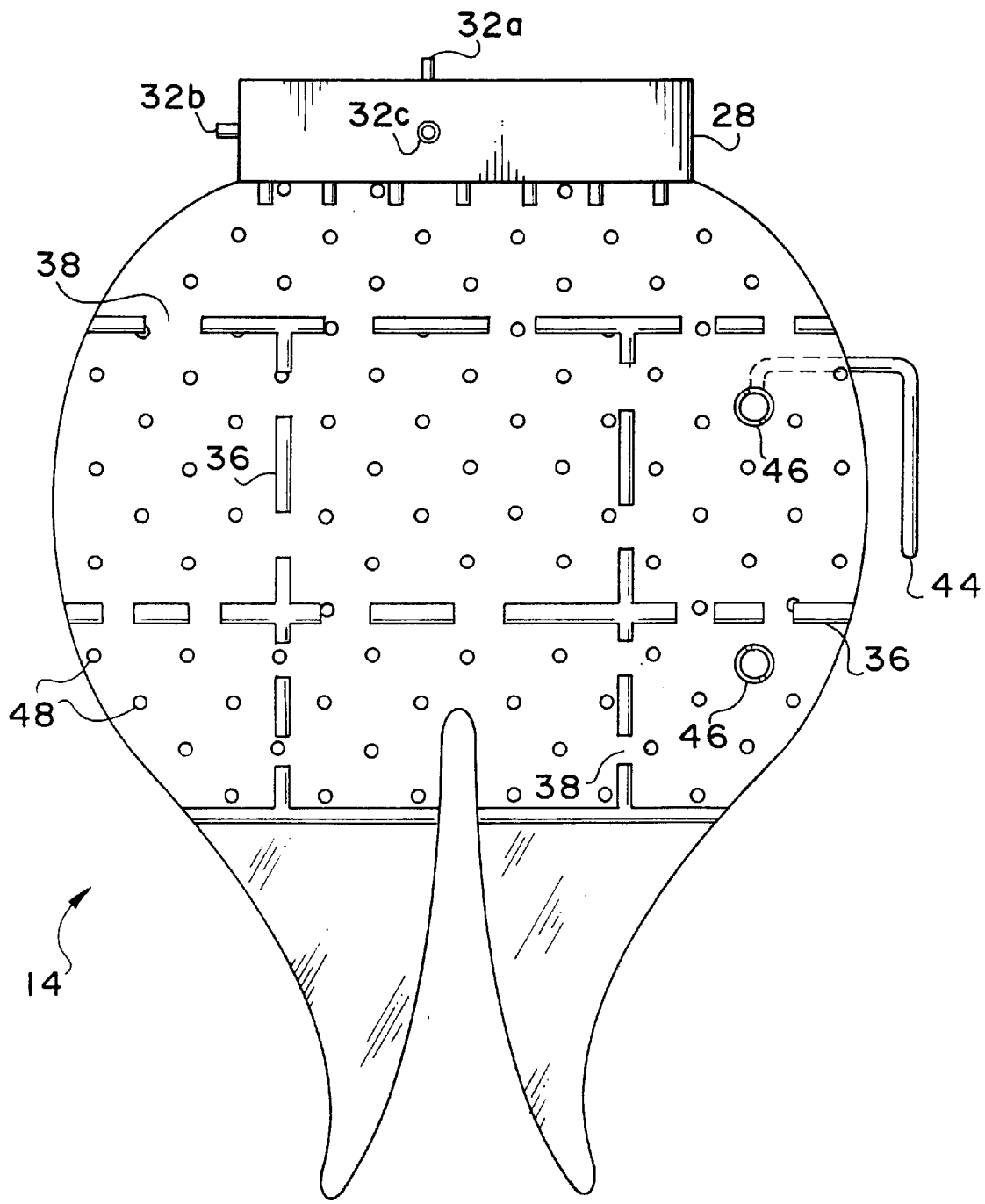
FIG. 3 is a bottom view of the lower plate of a fifth wheel according to the present invention with the grease pan removed.

A grease pan 34 is welded to the bottom side of the lower plate 14 of the fifth wheel. The grease pan 34 is divided into seven different compartments, designated 34a, 34b, 34c, 34d, 34e, 34f, and 34g, which are formed by welding a compartment housing to ridges 36 projecting from the bottom surface of the lower plate 14, as shown more particularly in FIG. 3. A plurality of gaps 38 defined in the ridges 36 form interconnecting passageways between each compartment and its adjoining compartment(s) for the flow of grease. The gaps 38 may be cut completely through the ridges 36, as shown in FIG. 3, or only partially through the ridges 36, provided that there is a gap for grease to flow between the compartments 34a through 34g. Each compartment of the grease pan 34 is supplied with grease from the grease manifold 28 by a grease hose 40 connected to quick connect grease fittings 42 mounted on the grease pan 34.

The lower plate 14 shown in the drawings includes a disconnect latch 44 as part of the locking mechanism (not shown) for releasing the kingpin 20. The disconnect latch 44 may include a pair of springs (not shown) which extend through holes 46 defined in the lower plate 14. The compartments through which the holes 46 extend are sealed to prevent the loss of grease or entry of air through the holes 46. In practice the lower plate 14 may have other irregularities in its surface to accommodate hold down pins or other devices to secure the lower plate 14 to the tractor 18 or the upper plate 10 to the lower plate 14. In such case the affected compartments of the grease pan 34 are sealed around the irregularity so that no grease leaves the compartment and no air enters the compartment trough the irregularity Hold down pins and other devices have their own greasing systems, and the grease pan 34 should remain relatively air-tight. The grease manifold 28 is preferably welded to the front surface of the lower plate 14 and the front of the grease pan 34.

Figure 4:
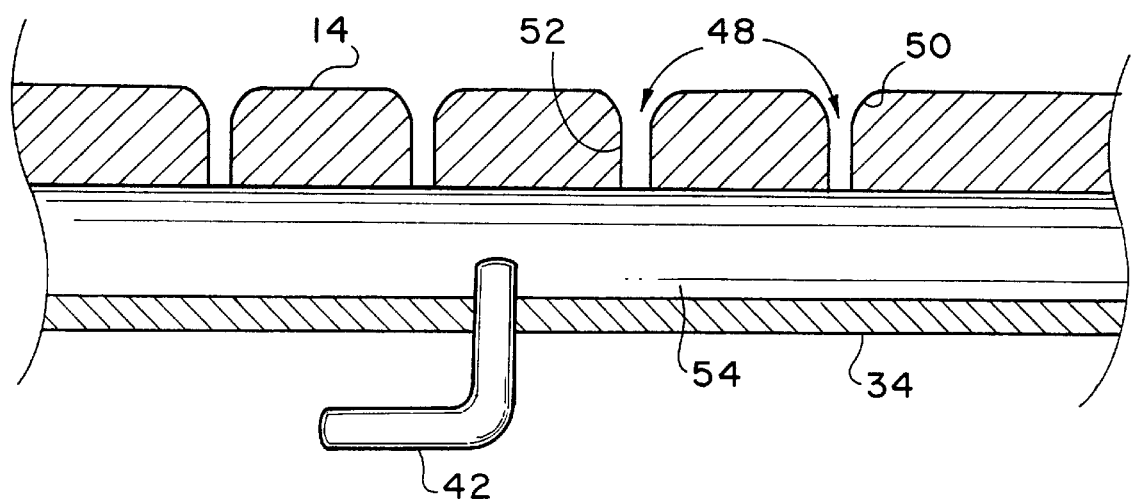
FIG. 4 is a vertical section view through a portion of the lower plate of the fifth wheel according to the present invention.

As shown in FIGS. 1 and 3, the lower plate 14 has a plurality of grease orifices 48 drilled through the plate 14 and extending axially through the plate 14 in order to provide passageways for the grease from the grease pan 34 to the bearing surface of the lower plate 14. As shown more particularly in FIG. 4, the orifices 48 are countersunk, with the head 50 towards the top surface and the shaft 52 towards the bottom surface of the lower plate 14. In this way pressure from the grease pump forces grease 54 through the manifold 28 and into the grease pan 34, through the narrow diameter of the shaft 52 and into the head 50, which serves to spread the grease 54 out and serves as a small reservoir of grease 54 near the bearing surface of the lower plate 14. Preferably the orifices 48 are drilled with a ¼" diameter shaft 52, a ½"countersunk head 50, and are spaced apart by 1½"in an X-shaped pattern, with four orifices 48 defining the corners of a square and a fifth orifice 48 defining the center of the square.

Figure 5:
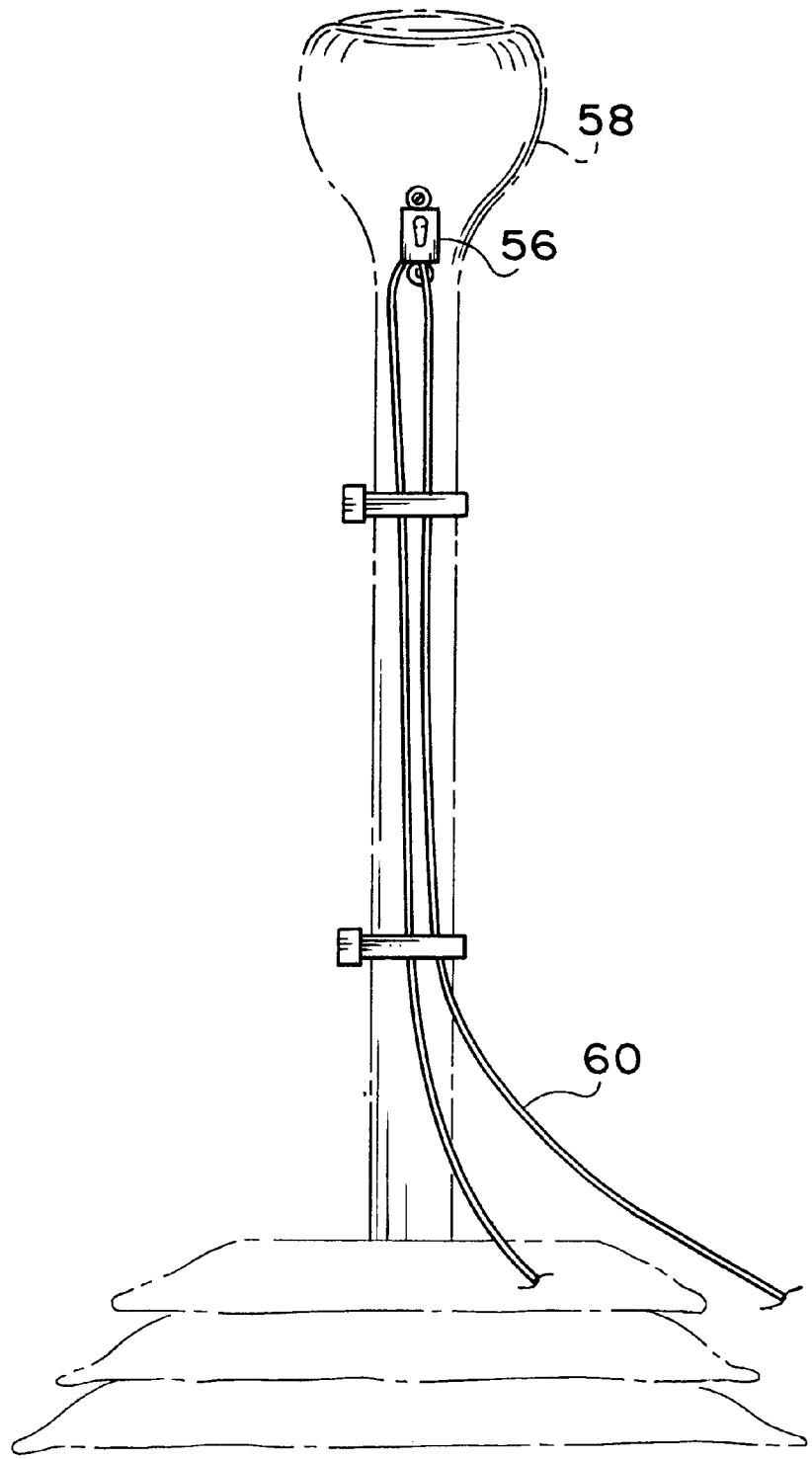
FIG. 5 is a perspective view of the electrical switch mounted on the gear shift of the tractor according to the present invention.

Operation of the greasing system is controlled by a push button switch 56 mounted on the gear shift 58 in the cab of the tractor 18, as shown in FIG. 5. Appropriate wiring 60 connects) the switch to the fuse panel (not shown) and to a solenoid 62 mounted at the grease pump 24.

In operation, when it is desired to apply grease to the fifth wheel, the operator presses down the push button switch 56. The switch energizes the solenoid 62, activating the grease pump 24 to draw air from the air tank 26 to force grease from the reservoir 25 through the grease line 30 to the grease manifold 28. From the grease manifold 28 the grease is forced into the compartments of the grease pan 34 and through the orifices 48 to the bearing surfaces at the interface between the upper 10 and lower 14 plates of the fifth wheel. Longitudinal and rotational movement of the plates 10 and 14 serve to distribute the grease uniformly between the bearing surfaces. Grease will continue to be applied as long as the push button switch 56 is depressed. The gaps 38 defined in the ridges 36 ensure a uniform distribution of grease in the seven compartments of the grease pan 34. When the greasing system is first installed, it will take building enough pressure to force grease from the reservoir 25 to fill the hoses 30 and 40 and the grease pan 34 and through the orifices 48. Once installed, the operator should be able to apply enough grease to maintain lubrication of the fifth wheel in a matter of a few seconds. It is recommended that the greasing system be operated every time the vehicle is loaded. Thereafter, the operator may apply grease as needed, even when the vehicle is in motion.

Routine maintenance of the system only requires that the reservoir 25 be refilled with grease as needed, and that sufficient air pressure be maintained in the air tank 26. Pressure may be maintained in the air tank 26 either by periodically refilling the tank 26 from a compressor at a fixed location such as a service station, by providing a tap into the vehicle's air brake system, or by using a compressor instead of a tank 26 if a portable generator is available to power the compressor, or preferably by installing an additional compressor on the truck's diesel engine.

The pneumatic greasing system may be installed on new trucks as original equipment by the manufacturer, or as an after market add on.

It is to be understood that the present invention is not limited to the embodiments described above, but encompasses any and all embodiments within the scope of the following claims.

I claim:

1. A pneumatic greasing system for a fifth wheel of a tractor and semitrailer rig, the semitrailer having an upper plate including a kingpin depending from the upper plate and the tractor having a lower plate including a slot adapted for receiving the kingpin so that the weight of the semitrailer bears upon the lower plate when the kingpin engages the slot, comprising:

a) a pneumatic grease pump;

b) a grease reservoir connected to said grease pump;

c) a compressed air supply means for supplying said pneumatic grease pump with a supply of compressed air;

d) electrical means for activating said pneumatic grease pump;

e) a lower plate adapted to be attached to a tractor, the lower plate being adapted for receiving a kingpin depending from the upper plate of a semitrailer, said lower plate including a top bearing surface and a bottom surface, said lower plate having a plurality of grease orifices extending axially through said lower plate;

f) a grease pan having a plurality of compartments attached to the bottom surface of said lower plate; and g) grease delivery means for delivering grease from said pneumatic grease pump to a grease manifold and said grease pan when said electrical means is activated.

2. The pneumatic greasing system for a fifth wheel according to claim 1, wherein said compressed air supply means comprises at least one compressed air tank.

3. The pneumatic greasing system for a fifth wheel according to claim 1, wherein said compressed air supply means comprises at least one air compressor.

4. The pneumatic greasing system for a fifth wheel according to claim 1, wherein said electrical means comprises:

a) a push button switch adapted for physical connection to a gear shift lever in said tractor; and b) a solenoid attached to said pneumatic grease pump and electrically connected to said push button switch, whereby depressing said push button switch energizes said solenoid in order to activate said pneumatic grease pump.

5. The pneumatic greasing system for a fifth wheel according to claim 1, wherein the bottom surface of said lower plate includes a plurality of ridges projecting therefrom, said ridges defining the boundaries of said plurality of compartments, said ridges having a plurality of gaps defined therein in order to provide interconnecting passageways between said compartments adapted for the flow of grease.

6. The pneumatic greasing system for a fifth wheel according to claim 1, wherein each compartment of said plurality of compartments defined in said grease pan is adapted for being supplied with grease from said grease manifold independently.

7. The pneumatic greasing system for a fifth wheel according to claim 1, wherein each orifice of said plurality of orifices is defined by a countersunk drill hole, the drill hole having a narrow diameter shaft opening on the bottom surface of said lower plate and a head having a larger diameter than said shaft opening on the bearing surface of said lower plate.

8. The pneumatic greasing system for a fifth wheel according to claim 1, wherein said grease delivery means comprises:

a) a grease hose connected between said pneumatic grease pump and said grease manifold, the grease hose and said grease manifold having a mating quick connect grease fitting; and b) a plurality of grease hoses connecting said grease manifold with each of said plurality of compartments defined in said grease pan, each of said plurality of grease hoses and each of said plurality of grease compartments having mating quick connect grease fittings.

* * * * *